(12) United States Patent
Brunswig et al.

(10) Patent No.: US 7,844,615 B2
(45) Date of Patent: Nov. 30, 2010

(54) SYSTEMS AND METHODS FOR AN ENTERPRISE SERVICES FRAMEWORK USING A STATE MODEL

(75) Inventors: Frank Brunswig, Heidelberg (DE); Martin Hartig, Speyer (DE); Stefan Rau, Dielheim (DE); Johannes Viegener, Karlsruhe (DE)

(73) Assignee: SAP AG, Walldorf (DE)

( * ) Notice: Subject to any disclaimer, the term of this patent is extended or adjusted under 35 U.S.C. 154(b) by 450 days.

(21) Appl. No.: 11/305,113

(22) Filed: Dec. 19, 2005

(65) Prior Publication Data

US 2007/0143247 A1 Jun. 21, 2007

(51) Int. Cl.
*G06F 7/00* (2006.01)
(52) U.S. Cl. .................................................. 707/758
(58) Field of Classification Search .................. None
See application file for complete search history.

(56) References Cited

U.S. PATENT DOCUMENTS

| | | | |
|---|---|---|---|
| 6,377,960 B1 | 4/2002 | Qiu et al. | |
| 6,442,552 B1 * | 8/2002 | Frolund et al. | 707/10 |
| 6,785,722 B2 | 8/2004 | Vuong et al. | |
| 7,359,863 B1 * | 4/2008 | Evenshaug et al. | 705/4 |
| 2002/0091702 A1 | 7/2002 | Mullins | |
| 2002/0099688 A1 * | 7/2002 | Attaluri et al. | 707/1 |
| 2003/0208505 A1 | 11/2003 | Mullins et al. | |
| 2004/0006549 A1 | 1/2004 | Mullins et al. | |
| 2004/0153414 A1 | 8/2004 | Khaishgi et al. | |
| 2005/0086203 A1 * | 4/2005 | Gauweiler | 707/3 |
| 2006/0230019 A1 * | 10/2006 | Hill et al. | 707/2 |

* cited by examiner

*Primary Examiner*—Pierre M Vital
*Assistant Examiner*—Truong V Vo
(74) *Attorney, Agent, or Firm*—Finnegan, Henderson, Farabow, Garrett & Dunner, L.L.P.

(57) ABSTRACT

Embodiments consistent with the principles of the invention check, before the data underlying a changed primary object is persistently save, for related objects whose data is also affected by the change. The related objects may be two or more degrees removed from the primary object. The changed primary object and all its changed related objects are then persistently saved together, so that the saved data is consistent across the related objects. Embodiments consistent with the principles of the invention also provide a state model for controlling access to services by clients and for making services available by servers.

19 Claims, 8 Drawing Sheets

| Core Service | Category/Type | Comment |
|---|---|---|
| Retrieve | Retrieval-Op | |
| Retrieve By Association | Retrieval-Op | |
| Query | Retrieval-Op | |
| GetValueSet | Retrieval-Op | |
| EndRetrieveOp | Explicit Phase Control | Out: Messages and Properties |
| Update | Operation | |
| Delete | Operation | |
| Create | Operation | |
| Action | Operation | |
| EndOperationOp | Explicit Phase Control | Out: Messages and Properties |
| Check | Transaction | Out: Messages and Properties |
| Save | Transaction | Out: Messages and Properties |
| Cleanup | Transaction | |

405 — Core Service
410 — Category/Type
415 — Comment
420 — Retrieve, Retrieve By Association, Query, GetValueSet
435 — EndRetrieveOp
425 — Update, Delete, Create, Action
440 — EndOperationOp
430 — Check, Save, Cleanup

SYSTEMS AND METHODS FOR AN ENTERPRISE SERVICES FRAMEWORK USING A STATE MODEL

FIELD OF THE INVENTION

The present invention relates to maintaining databases, and more particularly to maintaining database consistency in a multi-object, client-server, service-oriented architecture system.

BACKGROUND

The front ends of most business applications presents and accepts information in a user-friendly fashion. A business application is typically designed with a graphical user interface (GUI) that displays information by mimicking something a user is accustomed to seeing and working with, such as a business form, a shipping label, or a questionnaire. Beneath the GUI level, however, the information may be organized far differently than its manner of display might suggest. For example, displayed information may be organized into several object oriented programming (OOP) objects, which may, in turn, have several OOP objects dependent on, related to, or connected to them, for example via method calls. Further and at a more basic level, each of the OOP objects may store its data in several different database rows contained in several different database tables, and this data may be interdependent, interrelated, or interconnected in some manner, for example, through shared data, shared tables, foreign keys, etc.

These layers of objects and their associated database entries are difficult to correctly update and maintain because any relevant interrelated and interdependent objects (and thus their underlying database data) should be changed as needed for consistency whenever an object is changed. Similarly, changes to an object and its data should be prevented if relevant interrelated and interdependent objects and data cannot be changed as needed to maintain synchronization between related objects and data. This is difficult to do in systems where the user, and to a lesser extent the front end application, typically has no awareness of the layers of objects and database entries connected to the information displayed, entered, and manipulated on the GUI. For example, in service-oriented architectures, the front end application typically interacts through service requests with a backend that maintains the objects and databases. The services are typically self-contained and do not depend on the context or state of the other services and thus may access the same underlying objects and databases used by other services at the same time as other services, destroying the synchronization among objects and among data.

Database transaction processing systems face a somewhat similar problem where a single transaction can update many different databases. Such systems often use a two-phase commit to help address the problem, which enables the databases to be returned to the pre-transaction state if some error condition occurs. The two-phase commit strategy is designed to ensure that either all the databases are updated or none of them, so that the databases remain synchronized. In a two-phase commit, database changes required by a transaction are initially stored temporarily by each affected database. The transaction monitor then issues a "pre-commit" command to each database which requires an acknowledgment. If the monitor receives the appropriate response from each database, the monitor issues the "commit" command, which causes all databases to simultaneously make the transaction changes permanent. Otherwise, all the temporarily stored changes are rolled back and discarded. The two-phase commit strategy, however, only applies to the database operations that are part of a transaction, which are not based on relationships between OOP objects. Thus, a two phase commit does not solve all the problems associated with multidatabase transactions. For example, it does not address finding and changing additional objects and database entries that are related to or dependent from another object.

Accordingly, it is desirable to provide systems and methods for finding and changing objects (and their underlying data), that are related to or dependent on an object that is changed by a user application, maintaining consistency among all the related objects and their associated data. It is also desirable to provide a clear framework defining the times at which object-modifying services can be requested and the times at which object-modifying services must be provided.

SUMMARY OF THE INVENTION

In accordance with the invention, embodiments provide methods, systems, and computer programs for saving business objects comprising components and operations for: receiving a modified business object; determining a set of related business objects traceable from the modified business object; modifying the set of related business objects based on a modification of the modified business object; determining whether both the modified business object and the modified set of related business objects can be saved; and saving both the modified business object and the modified set of related business objects upon a determination that both can be saved.

Other embodiments consistent with the invention provide servers, systems, and computer programs for saving business objects comprising components and operations for: receiving a save request specifying a business object to be saved; entering a software-controlled state in which receiving a service request will cause failure processing to occur; identifying a set of related business objects affected by data in the business object to be saved; modifying data in the set of related business objects to be consistent with the data in the business object to be saved; sending a plurality of pre-save checks to at least one database manager for the data in the business object to be saved and the data in the set of related business objects; committing the data in the business object to be saved and the data in the set of related business objects to at least one database controlled by the at least one database manager; and exiting the software-controlled state in which receiving a service request will cause failure processing to occur.

Additional embodiments and advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Reference will now be made in detail to exemplary embodiments of the invention, examples of which are illustrated in the accompanying drawings. Wherever convenient, the same reference numbers will be used throughout the drawings to refer to the same or like parts.

Figure 1:
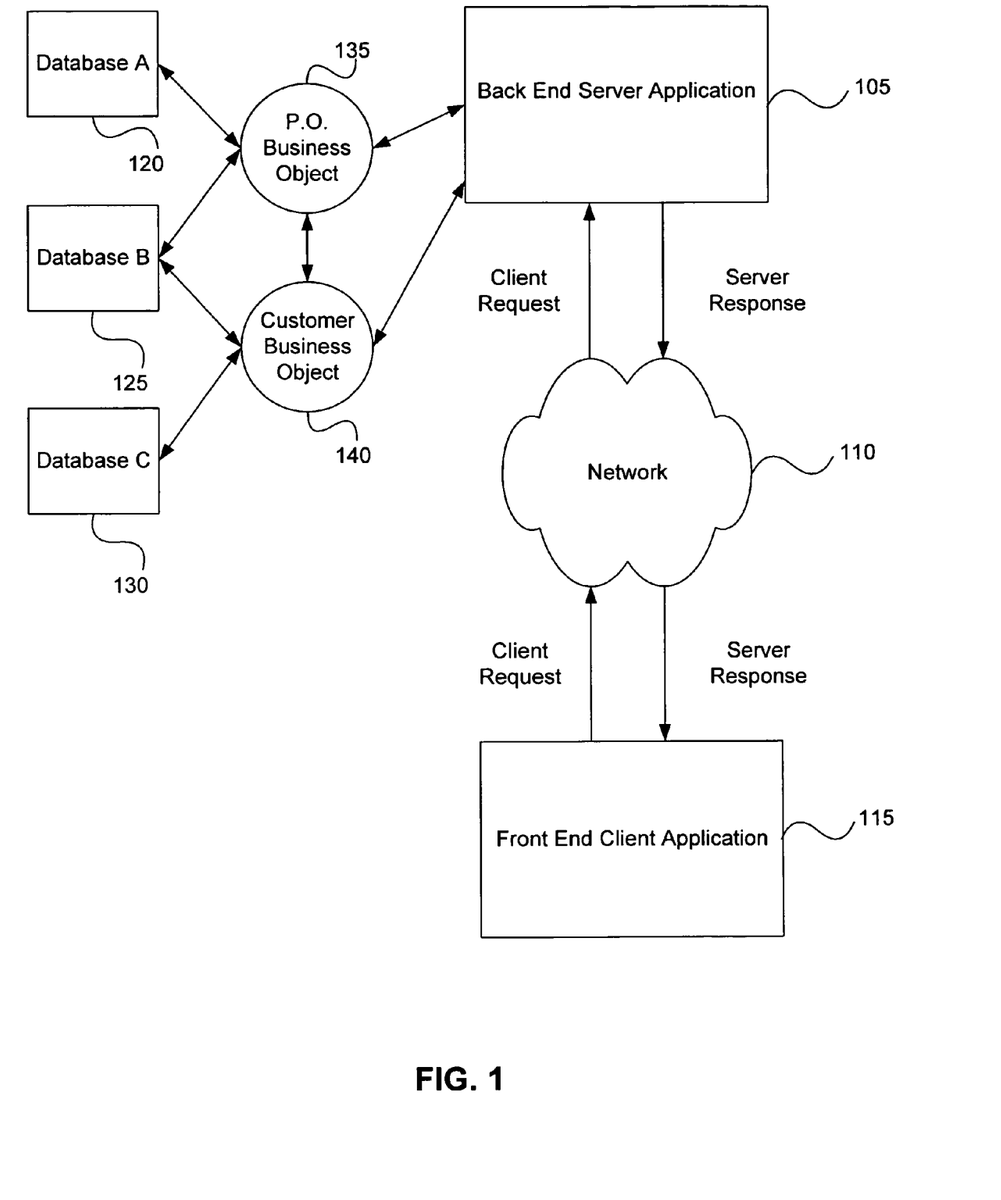
FIG. 1 is a diagram representing a client-server architecture consistent with an embodiment of the invention.

FIG. 1 is a diagram representing a client-server architecture consistent with an embodiment of the invention. As shown, two software applications, a back end server application 105 and a front end client application 115, communicate via a network 110. During typical operation, front end client application 115 sends client requests to back end server application 105 and receives server responses from back end server application 105. In processing a client request and formulating a server response, back end server application 105 may access and/or manipulate one or more business objects, such as a purchase order business object 135 and an invoice business object 140. In working with business objects, back end server application 105 may access one or more databases, such as database A 120, database B 125, or database C 130, which hold the data and information for various instances of business objects, such as purchase order business object 135 and invoice business object 140.

In one embodiment consistent with the invention, communication between the client and server is broken down into core services, which are organized based not on the business objects they affect, but on the service they provide. Information about the affected object(s) is part of the signature of a core service method. For example, the business object name, the node name, and a list of associated entities may be part of such a signature.

In a more specific example, the signature for a query call method may include:

IN_BO_NAME—name of the business object;

IN_BO_NODE_NAME—name of a node within the business object;

IN_QUERY_NAME—name of the query that retrieves the data;

IN_SELECTIONS—parameters for selecting the data base; and

OUT_KEYS—result set.

In a broad sense, business objects are objects used in business applications. More precisely, the data (often called business data because it relates to business transactions and parties, such as customers, orders, and the like) of a business system, such as is illustrated in FIG. 1, may be organized into business objects. For example, the SAP OLTP-R/3™ business system uses such data to form business objects ("Bdocs") that are used as data containers for further processing. Considering a product order by way of example, a business object may contain, for a particular product order, all the data associated with the order irrespective of what form the logical structure of the data takes in storage, such as in the tables of a relational database(s), such as an SAP OLTP-DB™ database. The logical structure is known to a back-office business system, such as OLTP-R/3™, which can access the data underlying the business objects.

Specific examples of business objects in an airline database system might include:

FlightBooking—list of all bookings of all flights;

FlightConnection—all existing flight connections;

FlightCustomer—all customers of any Airlines; and

Meal—ordered meals of customers related to a specified flight bookings.

Different business objects may interact with the same database, as shown by the connections to database B 125 in FIG. 1, and may interact with each other by sharing the same data from an underlying database. Business objects may also interact more directly with each other, for example via a method call from one business object that causes a change or reaction in another business object.

There are often connections, and chains of connections, between two, three, or more business objects. As they are used, business objects interact with each other, and changes or modifications to one business object often necessitates changes or creates side effects to other business objects. For example, when a new customer calls a company to order a product, the company may create a new purchase order business object, such as purchase order business object 135, to encapsulate and represent the order data. During the same order-taking process, the company may also create a new customer business object, such as customer business object 140, to encapsulate data about, and represent, the new customer, including customer data referenced and used by the purchase order object, such as the customer's address, telephone number, and billing terms (e.g., payment in full due in 90 days; or one-half payment due at time of order and the balance due on delivery). Because of the interconnections between the two objects, changes to the purchase order object may necessitate changes to the customer object, and vice versa.

These interconnections and interdependencies between business objects can create difficulties maintaining the objects, including difficulties at runtime at the database implementation level. For example, if business object data is stored in multiple databases, as shown in FIG. 1, and/or if more than one front end client application 115 (only one is shown in FIG. 1) are trying to simultaneously access the same business objects and/or databases, and/or related business objects and their underlying data, then it is difficult for a back end application to ensure that the data in the business objects and databases are accurately and consistently maintained during accesses from various sources and that access occurs at the proper time among various applications.

Systems, methods, and computer software consistent with principles of the invention may synchronously update related business objects when a subject business object is updated, including related business objects that may be several degrees removed from the subject business object, helping to solve such difficulties. Further, such systems, methods, and computer software may prevent conflicting access to business objects and their underlying data. In one embodiment, a state model implementation may be used to control access to business objects and determine when a requesting application or related object may read or write an object's data without conflicting or interfering with the access of other applications or objects to the same data.

For example, if front end client application 115 tries to modify purchase order business object 135 in a manner that would also result in a modification to data in database C 130 associated with customer business object 140, the modification may be prevented at runtime if another client application (not shown) is already in the process of modifying the same data in database C 130. Front end client application's 115 access to the data in database C 130 may be permitted after the other client application's (not shown) access is completed, and the data is stable.

Figure 2:
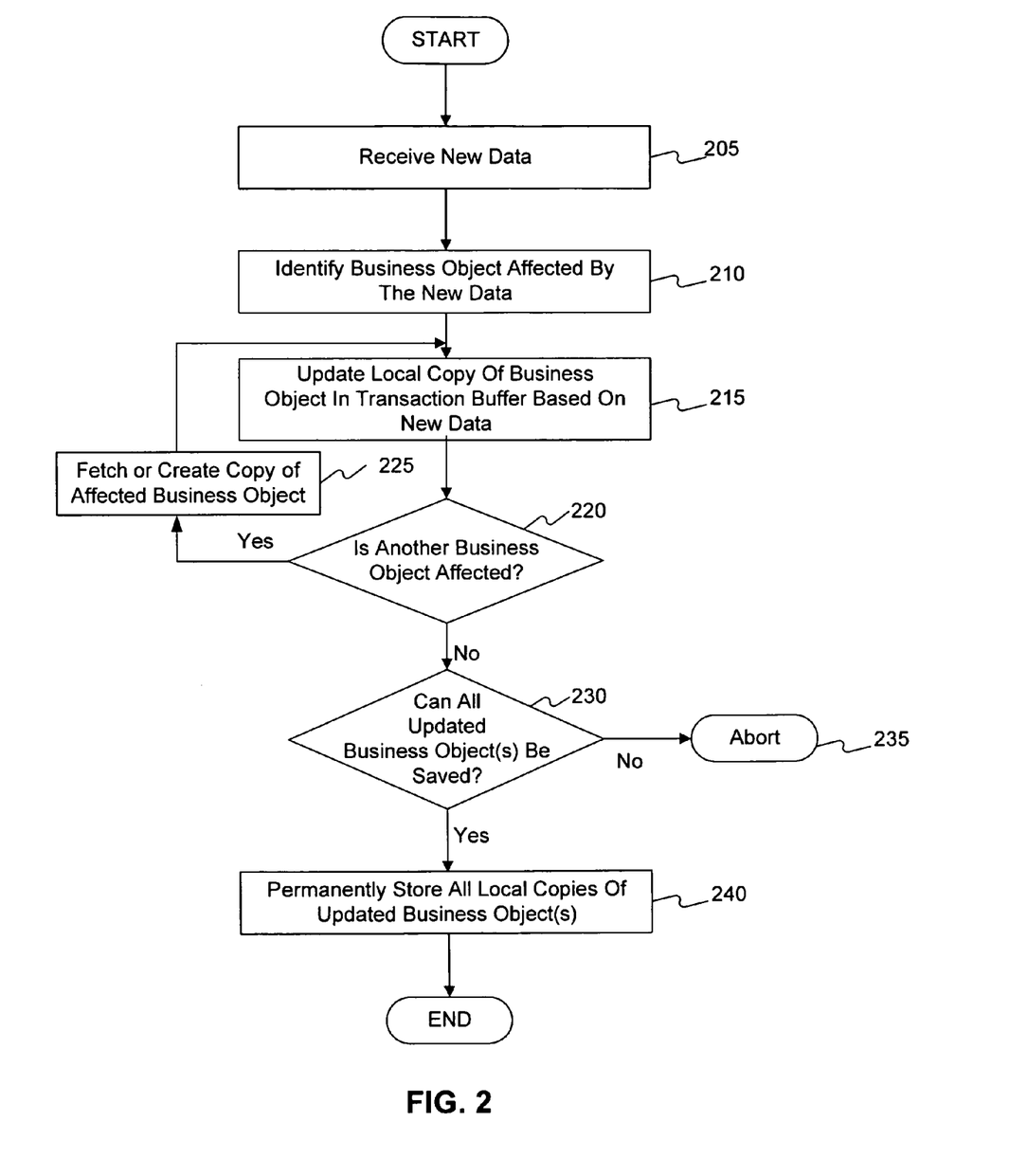
FIG. 2 is a flow chart of an exemplary process consistent with an implementation of the invention.

FIG. 2 is a flow chart of an exemplary process consistent with an implementation of the invention. Such a process may be implemented by software, hardware, or some combination of the two. As shown, the process begins by receiving new data (step 205). For example, the data may be new order data received from a client, such as front end client application 115 shown in FIG. 1.

Next, the process identifies a business object affected by the new data (step 210). For example, the process may determine that a purchase order business object must be created to process the new order data that was received.

Next, the process updates a local copy of the business object in a local transaction buffer based on the new data (step 215). For example, the process may use the new data to populate a new purchase order business object or to update a local copy of an existing purchase order business object whose data was just fetched from a database. In one implementation, the transaction buffer is not a persistent database; it is a local holding area.

The process then determines whether another business object(s) is affected by the new data or the processing of the business object (step 220). In one embodiment, an application uses change notifications to assist with this determination, creating a notification with the key of the data that is also affected, and the determination is done at the business object level. If another object is affected (step 220, Yes), the process retrieves (for an existing object) or creates (if a new business object is needed) a local copy of the affected business object and loops up to update the copy of the additional affected object based on the new data. This updating may include changing the value of some of the data in the additional affected object to be consistent with the data in the other updated business objects. For example, if the new data received is for a new customer, then a customer business object may have to be created in addition to the purchase order, or if the new data received includes a product order, then a manufacturing order business object for the factory may have to be created in addition to the purchase order. This loop may continue until all business objects connected to the new data are processed and data is consistent among them, including processing business objects more than once to account for subsequent changes to related business objects during the loop.

After all affected business objects are processed (step 220, No), then the process determines whether all the updated business objects can be permanently saved (step 230). For example, if the updated business objects store data in three different databases, the three databases may be checked to determine whether the data associated with the local copies of the objects can be written into each of the databases at the current time. This may be the first phase of a two-phase commit.

If one of the updated business object(s) cannot be saved (step 230, No), then the process aborts 235 in a defined way, for example by performing cleanup processing. For example, a business object may not be savable because of a technical reason, such as the database being unavailable or a program crash, or because of a process reason, such as a customer object having no credit limit information or a purchasing specialist not entering an order limit for a specific purchase order.

If, on the other hand, all the updated business object(s) can be saved in databases or other permanent repositories for the business object data (step 230, Yes), then the process proceeds to permanently store the data from all the local copies of the updated business object(s) in the appropriate repositories (step 240), such as committing the data to a database, and ends.

Figure 3:
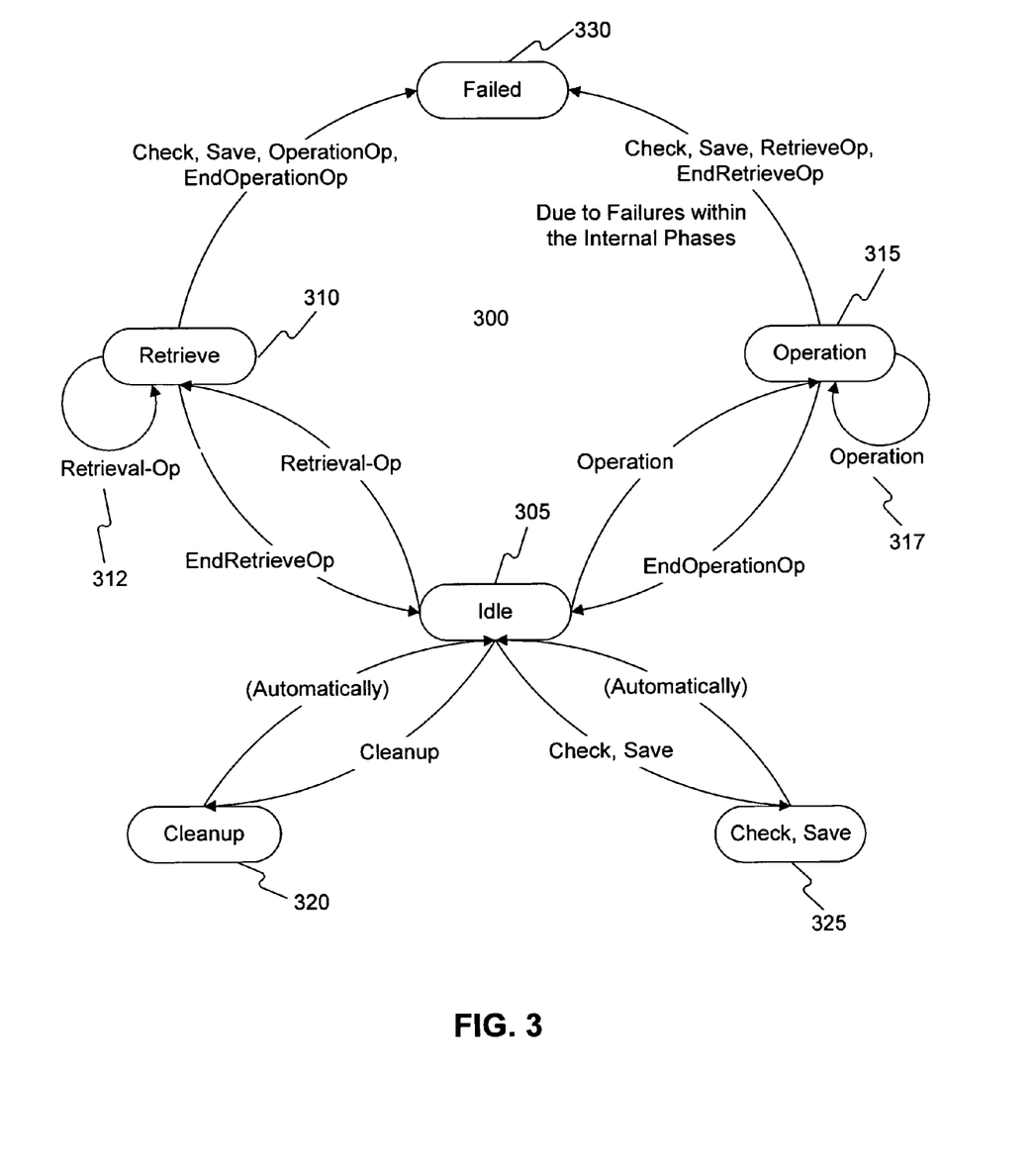
FIG. 3 is a state diagram of an exemplary system embodiment consistent with the invention.

FIG. 3 is a state diagram of an exemplary system embodiment consistent with the invention. The state model shown describes an example of the contracts and the constraints that must be fulfilled by a consumer of services, such as front end client application 115 from FIG. 1, and a provider of services, such as back end server application 105 from FIG. 1. The contracts and constraints provide consumers and providers of services with a clear picture of the conditions under which services may be called and services may be provided to provide orderly, non-conflicting access to interrelated business objects and their underlying data. In one embodiment, the states are implemented in the "back end" of a client server application, and the "front end" client provides the inputs that cause state transitions.

The system 300 begins operation in an idle state 305. In idle state 305, the system is waiting for inputs, such as service requests. From idle state 305, the system may transition to another state, or phase, based on input(s) received while in idle state 305. As shown, if the system receives an operation-type input, it will transition from idle state 305 to operation state 315. Similarly, if the system receives an retrieval-op-type input, it will transition from idle state 305 to retrieve state 310. Also similarly, the system will transition from idle state 305 to cleanup state 320 if it receives a cleanup input, and the system will transition from idle state 305 to check/save state 325 if it receives a check or save input. In one embodiment, if the system receives an input other than those defined to cause a transition to retrieve state 310, operation state 315, cleanup state 320, check/save state 325, the system will transition (not shown) from idle state 305 to failed state 330.

Figure 4:
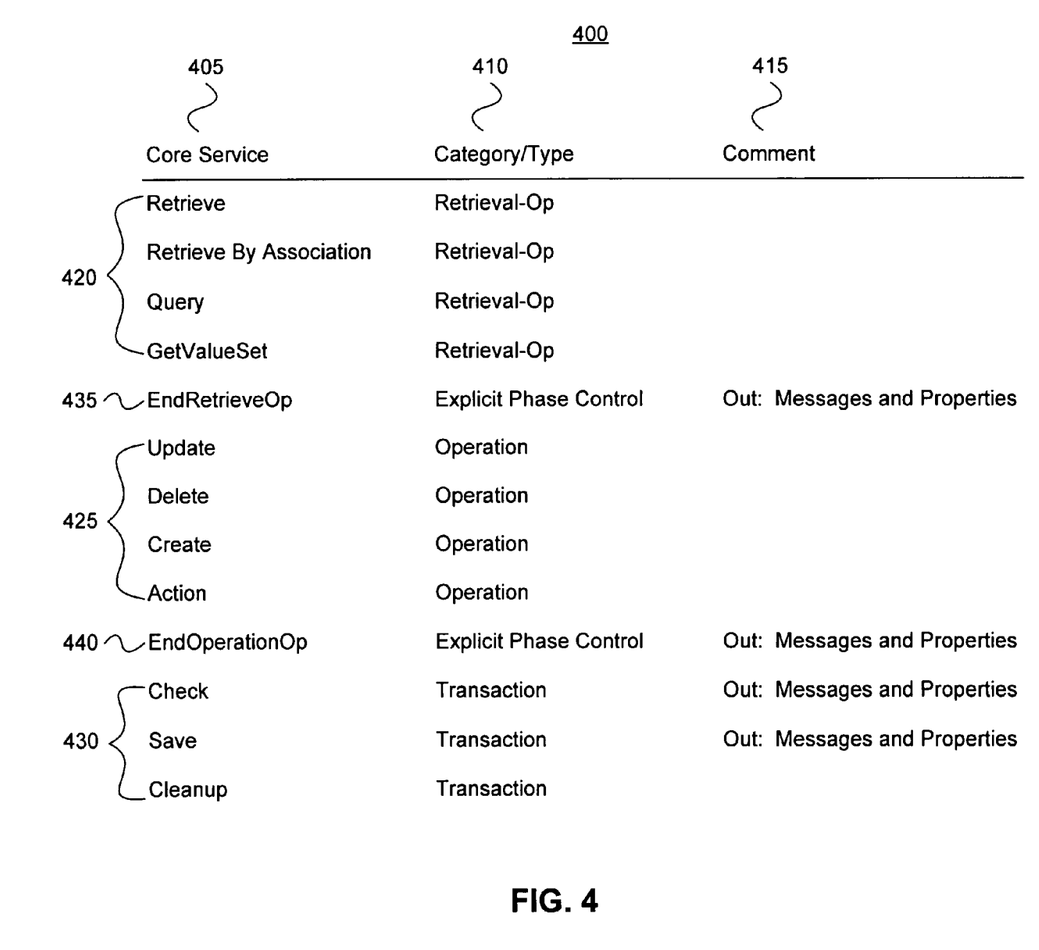
FIG. 4 is a table showing exemplary core service requests sorted by category type for state or phase management of an embodiment of a system consistent with the invention.

In one embodiment, the inputs to the system that cause state transitions are client service requests. Refer for a moment to FIG. 4. FIG. 4 is a table 400 showing exemplary service requests 405 sorted by category type 410 for state or phase management of an embodiment of a system consistent with the invention. As shown, the Retrieve, RetrieveByAssociation, Query, and GetValueSet service requests 420 are retrieval-op-type requests, such as may cause a transition from idle state 305 to retrieve state 310 as shown in FIG. 3. In one embodiment, Retrieve returns the data for a specified list of keys of a business object node. Retrieve may get a number of data sets for a number of keys. The operation may be designed to return exactly the requested data, and the data may be specified by an exact key. A key is a positive identifier of a data set (e.g., "MaterialNumber" is a key). A business object node collects datasets of the same type, such as "customer address." A business object may represent a form, such as a purchase order, with all its sub items, and may be referred to as a business object nodes. RetrieveByAssociation returns the data for a specified list of keys of a business object node associated with another business object node. RetrieveByAssociation returns a various number of data sets or keys related to a data set—e.g. all order items of an order—where an order has several items related to it. RetrieveByAssociation processes a relation (i.e., an association) between different types. For example, a parent-child association (also called composition in an object oriented environment), an association between nodes within a business object, or an association to other business objects, which are typically the interconnections in a service environment (e.g., a "Purchase Order" relates to "Supplier Address"). Query provides the result of a search request in a specific business object on a specific business object node, which result may consist of a collection of keys only or a collection of data including the keys; and GetValueSet returns a requested value set. For example, an implementation for "value help" may return all possible values of an input field on the user interface, which may be represented, for example, by a drop down list box. GetValueSet may return a set of keys of an attribute. For example, a "value help" in a purchase order on the field "Material" may return a list of all materials, which may be displayed in a drop down list box, and clicking on an item of the drop down list box may select the item and copy it to the "Material" field.

An EndRetrieveOp service request 435 is an explicit phase control request that causes a transition from retrieve state 310 to idle state 305, as shown in FIG. 3. As noted in comments column 415, the EndRetrieveOp service returns different kinds of processes and other parameters such as messages and properties of the retrieved database data. In one embodiment, EndRetrieveOp closes the data retrieval phase and returns various processes and parameters that have been accumulated since the last call of this service, such as accumulated messages and dynamic properties. In other embodiments, EndRetrieveOp may return other types of processes, messages, etc.

The Update, Delete, Create, and Action service requests 425 are operation-type requests, such as may cause a transition from idle state 305 to operation state 310 as shown in FIG. 3. In one embodiment, Update updates the data of a list of specified keys in a transactional buffer; Delete deletes the data and keys of a list of specified keys in the transactional buffer; Create creates new business object node elements containing keys and data in the transactional buffer; and Action executes an action on a specified list of keys of a business object node. In one embodiment, the client has to ensure that all accumulated data changes have been sent before sending the Action service request.

An EndOperationOp service request 440 is an explicit phase control request that causes a transition from operation state 315 to idle state 305, as shown in FIG. 3. In one embodiment, EndOperationOp closes the data modification phase and returns various kinds of processes and parameters, such as the messages and the change notifications based on keys that have been accumulated since the last call of this service.

The Check, Save, and Cleanup service requests 425 are transaction-type requests, such as may cause a transition from idle state 305 to cleanup state 320 or Check/Save state 325 as shown in FIG. 3. As noted in comments column 415, the save and check services various kinds of processes and parameters, such as messages (e.g., change notifications) and properties. Check validates the accumulated data changes in the transactional buffer, Save saves all accumulated data changes from the transactional buffer into the appropriate database(s), and Cleanup resets the transactional state by rolling back all the accumulated data changes. In one implementation consistent with the invention, the save state includes a multi-phase process for checking and changing related business objects before permanently saving changes.

In one embodiment consistent with the invention, the services 405 are implemented as interface methods. For example, the transaction type services D30 may provide transaction control to client applications. Thus, in one implementation of a remote client system, the client application programming interface may contain a method called save, which functions to persist all accumulated data changes. Or, the client may trigger a complete reset of the transactional state in the back end by calling a cleanup method. Similarly, a check method may trigger a validation of the complete transactional buffer. Such methods may also be called by processes within the back end. For example, a cleanup method may be executed by a service manager if a commit or rollback has been processed in the backend within save request processing.

Referring again to FIG. 3, in retrieve state 310 the system executes the service requests Query, Retrieve, RetrieveByAssociation, GetValueSet, and EndRetrieveOp. As shown, multiple retrieval-op-type requests 312, such as Query, Retrieve, RetrieveByAssociation, and GetValueSet, may be executed during retrieve state 310 without causing a transition to another state. A client application should use the EndRetrieveOp request to exit retrieve state 310 and cause a return to idle state 305, otherwise any following operation-type or transaction-type service requests may fail. If a client application submits an operation-type service request, an EndOperationOp service request, a check service request, or a save service request during retrieve state 310, the system will transition to failed state 330, as shown.

In operation state 315 the system executes the service requests Create, Update, Delete, Action, and EndOperationOp. As shown, multiple Operation-type requests 317, such as Create, Update, Delete, and Action, may be executed during operation state 315 without causing a transition to another state. A client application should use the EndOperationOp request to exit operation state 315 and return to idle state 305, otherwise any following retrieval-op-type or transaction-type service requests may fail. If a client application submits a retrieval-op-type service request, an EndRetrieveOp service request, a check service request, or a save service request during operation state 315, the system will transition to failed state 330, as shown.

In failed state 330, the system executes failure processing, such as aborting any ongoing transactions. In the embodiment shown the system will not automatically perform further processing or transition to another state after any failure processing completes, and the "roll area" cannot be reused. In one embodiment, every user of the system has their own memory on a server that is protected against other users, and this memory is called a roll area.

In cleanup state 320 the system executes rollback processing, as is known in the database arts. That is, in response to a cleanup service request, the system cancels the proposed changes in any pending database transactions, such as those initiated by an operation-type service request. The system automatically returns to idle state 305 after the rollback processing completes.

In check/save state 325 the system checks and saves pending database transactions. That is, the system permanently writes, or persists, database changes from a transactional buffer to the database(s). In one embodiments, front end clients should ensure that all pending updates have been sent to the back end server application before initiating the save operation with a save service request. The system automatically returns to idle state 305 after the save processing completes.

Figure 5:
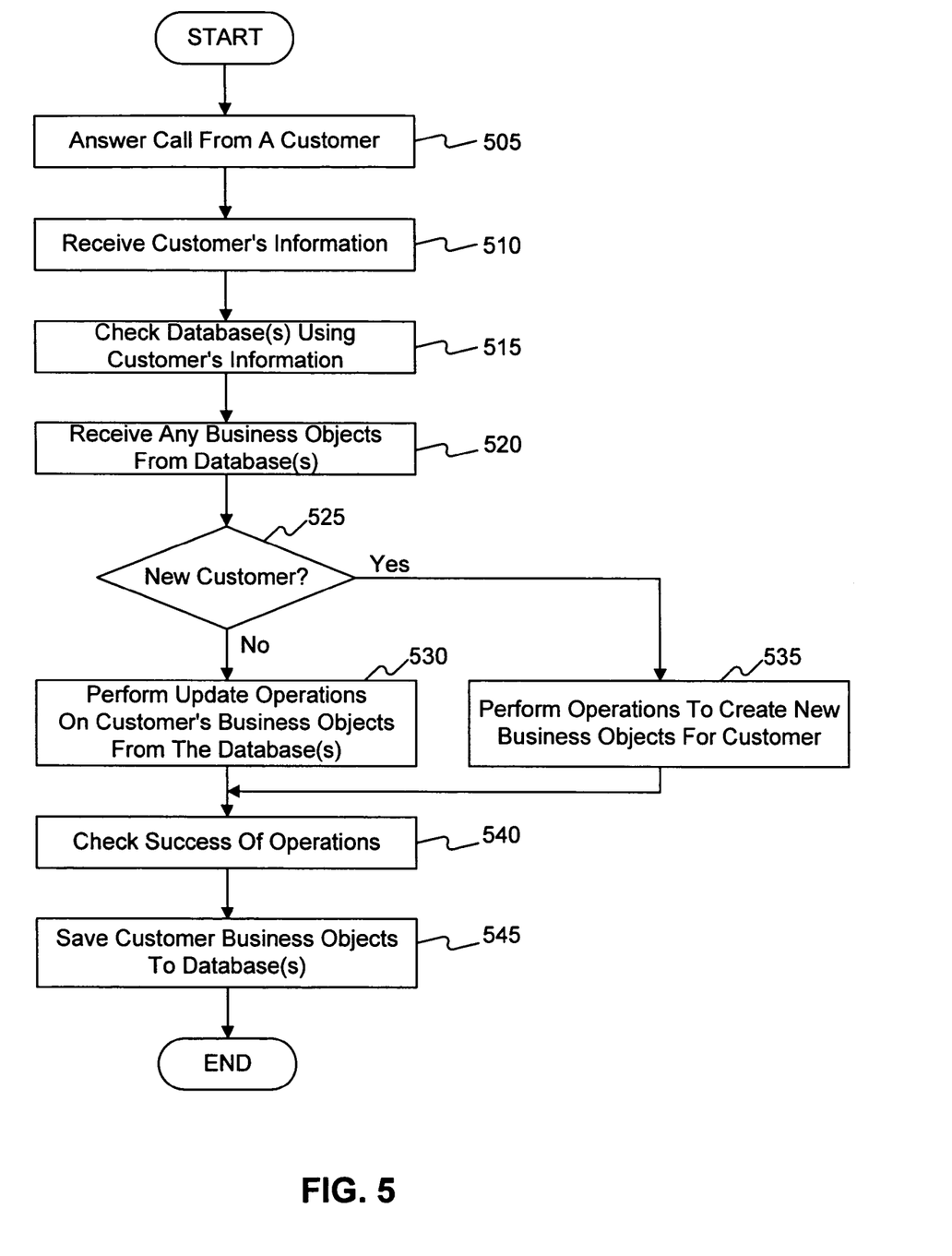
FIG. 5 is a flowchart illustrating an exemplary process for a client application consistent with an implementation of the invention.

FIG. 5 is a flowchart illustrating an exemplary process for a client application consistent with an implementation of the invention. Such a process may be implemented using software, hardware, or a combination of the two. As shown, the process starts by answering a call from a customer (step 505). For example, consider a call center that handles orders, inquiries, and other customer service tasks for a company or other organization. The operators at such a call center may run a user-friendly client application for processing customer information that communicates with a back end server application, such as front end client application 115 and back end server application 105 shown in FIG. 1. In an embodiment that uses a front end client application to implement the process of FIG. 5, such as might be the case for the embodiment shown in FIG. 3, the back end server application is in idle state 305 during this step of the front end client application process.

Next, the process receives the customer's information (step 510). For example, an operator may speak with a customer and type or otherwise enter information into a front end client application, or a customer may speak or otherwise enter information into an interactive voice response client application or an interactive client application that recognizes touchtone telephone button entries. The information may include a wide array of data, such as the customer's name, address, products or services the customer wishes to order, method of payment, information about existing orders, billing information, shipment tracking information, delivery date information, document numbers, cancellation information, etc. In an embodiment that uses a front end client application to implement the process of FIG. 5, such as might be the case for the embodiment shown in FIG. 3, the back end server application remains in idle state 3705 during this step of the front end client application process.

Using the information from the customer, the process checks one or more databases using the customer-supplied information (step 515). For example, a call center operator may enter a customer's name into a form on a graphical user interface (GUI) and activate a control to retrieve additional information associated with the customer's name from the organization's database(s), such as information regarding the customer's customer number, address, order history, payment history, credit line size, shipping preference, etc. In an embodiment that uses a front end client application to implement the process of FIG. 5, such as might be the case for the embodiment shown in FIG. 3, the back end server application transitions from idle state 305 to retrieve state 310 in conjunction with this step of the front end client application process because the front end client sends a retrieval-op-type client request D20 to the back end server application to fetch data about the customer from the database(s).

Next, the process receives any relevant business objects from the database(s) (step 520). For example, the process may receive a customer business object containing basic data about the customer, such as name, address, telephone number, customer number, etc. The process may also receive related business objects, such as business objects containing data about the customer's order history and payment history. In one embodiment, the information from the business objects is displayed in a user-friendly way on a GUI.

In an embodiment that uses a front end client application to implement the process of FIG. 5, such as might be the case for the embodiment shown in FIG. 3, the back end server application transitions from retrieve state 310 to idle state 305 in conjunction with this step of the front end client application process after retrieving the customer related data and objects, or an indication that there is none, from the appropriate database(s). In idle state 305, the back end server application transmits a server response to the front end client with the retrieved business objects (if any). For example, if the customer is new, there will not be any relevant business objects in the organization's database. In one embodiment, the front end client operation may sends a retrieval operation when a screen refreshes and sends an EndRetrieveOp after a retrieval operation is done, which causes the transition back to idle.

The process then determines whether the customer is a new customer (step 525), based on the business objects received from the database(s). For example, if no business objects associated with the customer are received, then the process determines that the customer is a new customer (step 525, Yes) and proceeds to perform operations to create business object(s) for the customer (step 535). In one embodiment, the client application creates and works with business objects, and the interface on the client side is object based. In this embodiment, operations are done on these object instances. For example, the process may create a customer object to contain basic information about the customer, such as name, address, telephone number, customer number, etc., and it may create a purchase order object to contain information about products or services the customer called to purchase, such as price, quantity, model number, tax, etc.

If, on the other hand, business object(s) associated with the customer are received, then the process determines that the customer is an existing customer (step 525, No) and proceeds to perform update operations on the customer's business objects that it received from the database (step 530), as appropriate. For example, the process may update an existing customer object to change basic information about the customer, if needed, such as address, telephone number, fax number, etc. Or, the process may change an existing purchase order object to contain new information about products or services the customer had previously ordered, such as a different order quantity, a different model number, tax, etc. Or, the process may create a may create a new purchase order object to contain information about products or services the customer called to purchase, such as price, quantity, model number, tax, etc.

In an embodiment that uses a front end client application to implement the process of FIG. 5, such as might be the case for the embodiment shown in FIG. 3, the back end server application transitions from idle state 305 to operation state 315 in conjunction with steps 530 or 535 of the front end client application process because the front end client sends an Operation type client request 425 to the back end server application to create, delete, update, or perform some other action on a business object(s) and its associated data. Some embodiments consistent with the invention may automatically update business objects that are affected by a change initiated by a client application, as well as the requested business object itself, as explained previously. Other embodiments consistent with the invention may update business objects during the save state. Consistent with the invention, an implementation may update any data in other business objects in the update state of a business object or before saving in a so called finalize state in the same way.

Next, the process checks the success of the operation(s) on the business objects (step 540). If any of the operations were unsuccessful, then failure processing (not shown) may be required. In an embodiment that uses a front end client application to implement the process of FIG. 5, such as might be the case for the embodiment shown in FIG. 3, the back end server application transitions from operation state 315 to idle state 305 in conjunction with this step of the front end client application process after manipulating the customer related data and objects. In idle state 305, the back end server application transmits a server response to the front end client containing messages and information about the changed customer business objects, such as a set of effective changes and data for rendering the changes on a GUI. If an operation was unsuccessful, that information is transmitted to the front end client application for failure processing. In one embodiment, the front end client operation sends a retrieval operation when a screen refreshes, and sends EndRetrieveOp after a retrieval operation is done, causing the transition back to idle.

If the operations were successful, then the process persistently saves the customer business objects to the database(s) (step 545), and ends. In an embodiment that uses a front end client application to implement the process of FIG. 5, such as might be the case for the embodiment shown in FIG. 3, the back end server application transitions from idle state 305 to check/save state 325 in conjunction with this step of the front end client application process because the front end client sends a check/save type client request 430 to the back end server application to save the changes.

Figure 6:
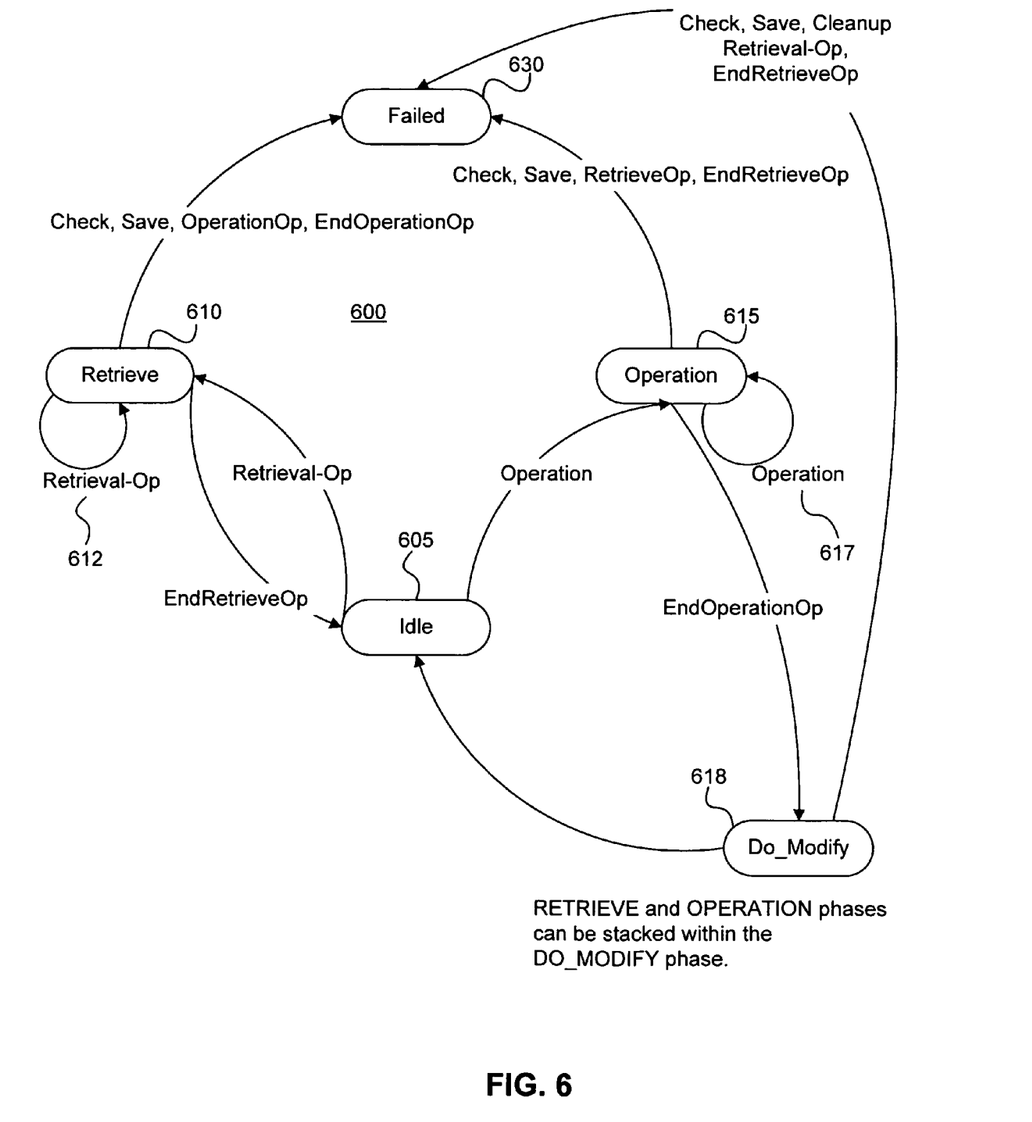
FIG. 6 is a state diagram of an exemplary system embodiment consistent with the invention providing details of states associated with operation state 615, including states that may not be visible to a user.

FIG. 6 is a state diagram of an exemplary system embodiment consistent with the invention providing details of states associated with operation state 615, including states that may not be visible to a user. The exemplary state model shown describes an example of some of the contracts and the constraints that must be fulfilled by a consumer of services, such as front end client application 115 from FIG. 1, and a provider of services, such as back end server application 105 from FIG. 1 in order to automatically maintain a set of related business objects and avoid conflicting access to their data.

As shown in FIG. 6, system 600 includes an idle state 605 and a retrieve state 610. Transition from idle state 605 to retrieve state 610 is triggered by a retrieval-op-type request as explained above with respect to FIGS. 3 and 4. Transition from retrieve state 610 to idle state 605 is triggered by an EndRetrieveOp request as explained with respect to FIGS. 3 and 4.

Similarly, system 600 may remain in retrieve state 610 to process multiple retrieval-op-type requests 612 and may transition to failed state 630 when a client application submits an operation-type service request, an EndOperationOp service request, a check service request, or a save service request during retrieve state 610, as explained above with respect to FIGS. 3 and 4.

As shown, if the system receives an operation-type input, it may transition from idle state 605 to operation state 615, as explained with respect to FIGS. 3 and 4. In operation state 615, the system executes the service requests Create, Update, Delete, Action, and EndOperationOp. As shown, multiple operation-type requests 617, such as Create, Update, Delete, and Action, may be executed during operation state 615 without causing a transition to another state. If a client application submits a retrieval-op-type service request, an EndRetrieveOp service request, a check service request, or a save service request during operation state 615, the system will transition to failed state 630, as shown.

A client application should use the EndOperationOp request to exit operation state 615 and eventually return to idle state 605, otherwise any following RetrievalOp or Transaction service requests may fail. As shown in this example, the system 600 will transition to do-modify state 618 after receiving an EndOperationOp request. In Do_Modify state 618, the system builds a "to do" list of service providers with pending operations in an appropriate order based on a local transaction buffer. In one embodiment, the system framework buffers all modifications like a printer queue buffers documents to print. The buffers are related to business objects, and every different business objects gets an internal buffer in the framework. The Do_Modify operation flushes these buffers and the application implementation gets its collected data at this point.

Retrieve and Operation states may be stacked within the do_modify state 618. In one embodiment, operations are stacked, similar to a call stack, and an implementation of a business object may call another business object by using this stack framework. If so, the state of the calling business object is stored in a stack. The state handler of the called business object should guarantee that only allowed states are chosen. For example, it should not be possible to update a called business object if the calling business object is in retrieve state. Various embodiments consistent with the invention may impose other restrictions regarding allowed and forbidden combinations.

From Do_Modify state 618, the system may transition to idle state 605. From Do_Modify state 618, the system may alternatively transition to failed state 630 if it receives a check request, save request, cleanup request, EndRetrieveOp request, or RetrieveOp request in do-modify state 618.

Figure 7:
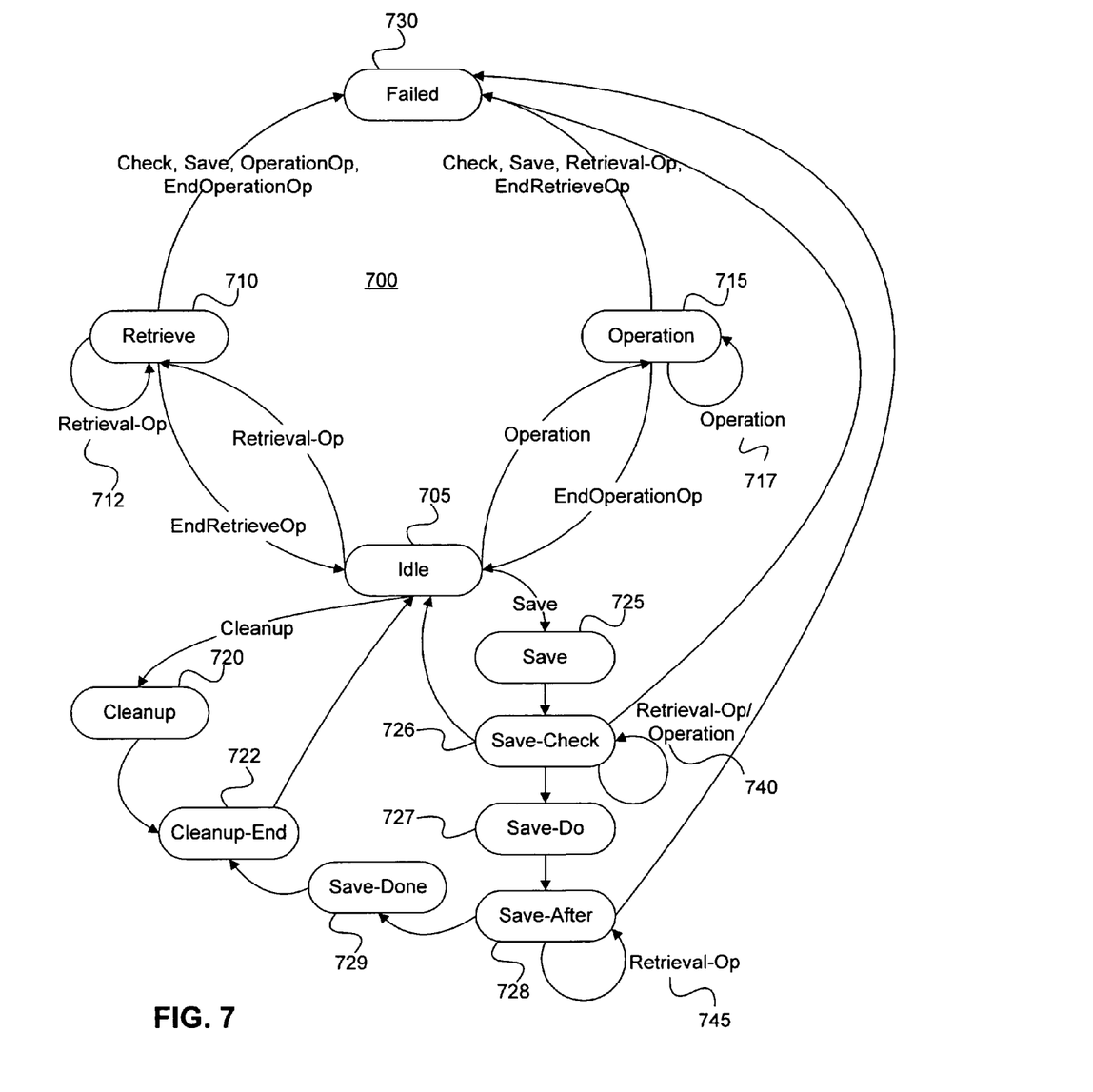
FIG. 7 is a state diagram of an exemplary system embodiment consistent with the invention, providing details of states associated with a save/check state, including states that may not be visible to a user.

FIG. 7 is a state diagram of an exemplary system embodiment consistent with the invention, providing details of states associated with a save/check state, including states that may not be visible to a user. The state model shown describes an example of the contracts and the constraints that must be fulfilled by a consumer of services, such as front end client application 115 from FIG. 1, and a provider of services, such as back end server application 105 from FIG. 1 in order to automatically maintain a set of related business objects and avoid conflicting access to their data.

As shown in FIG. 7, system 700 includes an idle state 705 and a retrieve state 710. Transition from idle state 705 to retrieve state 710 may be triggered by a retrieval-op-type request as explained above with respect to FIGS. 3 and 4. Transition from retrieve state 610 to idle state 705 is triggered by an EndRetrieveOp request as explained above with respect to FIGS. 3 and 4.

Similarly, system 700 may remain in retrieve state 710 to process multiple retrieval-op-type requests 712 and transition to failed state 730 when a client application submits an operation-type service request, an EndOperationOp service request, a check service request, or a save service request during retrieve state 710, as explained above with respect to FIGS. 3 and 4.

As shown, if system 700 receives an operation-type input in idle state 705, it may transition to operation state 715, as explained with respect to FIGS. 3 and 4. In operation state 615, the system may execute multiple operation-type requests 717, such as Create, Update, Delete, and Action. If a client application submits a retrieval-op-type service request, an EndRetrieveOp service request, a check service request, or a save service request during operation state 715, the system will transition to failed state 730, as shown. An EndOperationOp request will cause system 700 to exit operation state 715 and return to idle state 605, via, in one embodiment, a Do-Modify state (not shown), as explained with respect to FIG. 6.

From idle state 705, a cleanup service request will cause system 700 to transition to cleanup state 720, which cancels proposed changes in any pending database transactions. From cleanup state 720, system 700 automatically transitions to cleanup-end state 722, wherein system 700 sends cleanup status notifications to the service providers and then transitions back to idle state 705. Service providers are the implementation of business objects, i.e., the business application.

From idle state 705, a Save service request will cause system 700 to transition to a save state 725. This state is a preparation for the save cycle. In one embodiment, it is an internal system state that a service provider does not see. Before initiating a save transaction and causing system 700 to enter save state 725, a client should ensure that all pending updates have been sent to the service manager backend. In one embodiment, this is done implicitly. When the state machine is in idle mode then all data is sent from framework to provider. From save state 725, system 700 automatically transitions to save/check state 726.

In save/check state 726, system COO sends "before save" checks to the service providers, such as coding that checks valid quantities of a purchase order before saving it, such that if the check fails, then the save is not done, to verify that all the pending database changes can be made in the various affected databases. If any one "before save" check is rejected by a service provider, then the save process will be cancelled and system 700 will transition to idle state 705. As shown, system 700 may execute multiple retrieval-ops and operations 740 while in save/check state 726.

In one embodiment, there is no direct transition to retrieve state, but it is possible to retrieve data of other business objects in the service provider implementation of "save-check". In this embodiment, the system checks whether the implementation of "save-check" calls only retrieve operations. If so, then a new level of operation is opened (like a stack level in subroutine calls—and also named "Stacking"). In this new stack level a new instance of the state machine is started with idle state. A retrieval operation called in the service provider implementation is then checked against the new stack level.

From save/check state 726, system 700 may transition (not shown) to retrieve state 710 upon receipt of a retrieval-op-type service request. In one embodiment, the back end application (e.g., the stack handler) initiates the retrieval-op-type service request as part of stacking. Also from save/check state 726, system 700 may also transition to failed state 730 upon receipt of an EndRetrieveOp service request, an EndOperationOp service request, a check service request, a cleanup service request, or a save service request.

Failing receipt of a service request that causes a different transition, and upon successful completion of all "before save" checks of pending database changes, system 700 will automatically transition to save-do state 727. In save-do state 727, system 700 sends "do save" notifications to the service providers, asking them to implement the pending database changes, i.e., to write the new data into the database(s).

Next, system 700 automatically transitions to save-after state 728. In this state, system 700 sends "after save" notifications to the agents. In one embodiment consistent with the invention, an agent is a program that runs after a successful save. It may trigger any kind of operation. For example, an agent may start a printout after saving a leave request. In one embodiment, a program of any kind may register for an after save event, and the state "Save-After" starts all the registered programs. The registered programs may also receive a list with all changes from the save cycle, which they may operate on (or not). From save-after state 728, system 700 may transition (not shown) to retrieve state 710 upon receipt of a retrieval-op-type service request 745. In one embodiment, the state is stacked, as described with respect to the save-check state. If a client sends any other type of service request during save-after state 728, system 700 will transition to failed state 730.

Absent receipt of a service request that causes a different transition, and upon successful completion of sending "after save" notifications to the agents, system 700 will automatically transition to save-done state 729. In save-done state 729, system 700 performs commit work processing. In one embodiment, the system framework calls a commit work routine that flushes all database buffers (not the system framework buffers) to the data base, starts all background processes (e.g., update tasks), and releases all locks not used in update tasks.

Following save-done state 729, system 700 automatically transitions to cleanup-end state 722 and sends cleanup status notifications to the service providers before returning to idle state 705.

Figure 8:
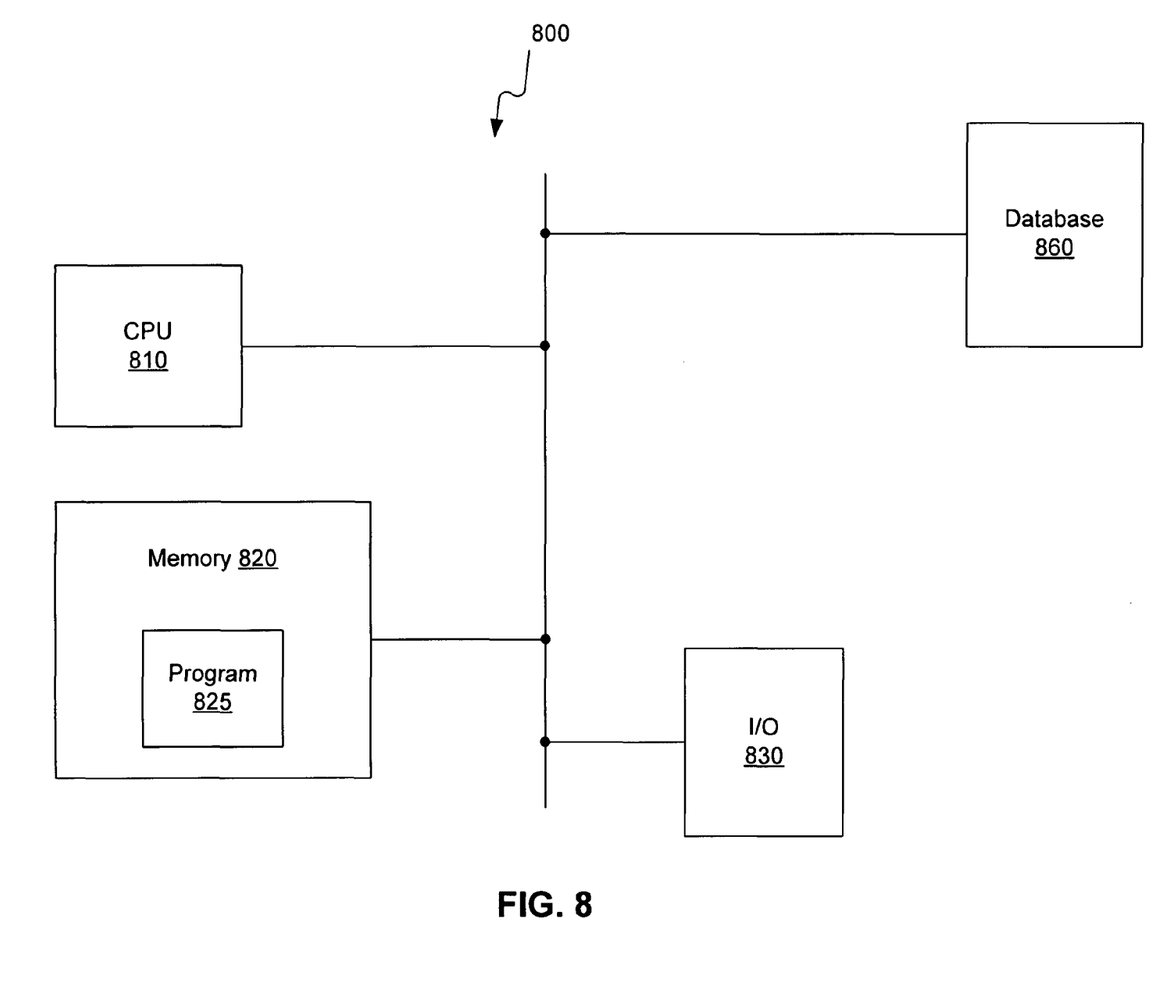
FIG. 8 illustrates an exemplary computing system that can be used to implement embodiments of the invention.

FIG. 8 illustrates an exemplary computing system 800 that can be used to implement embodiments of the invention. The components and arrangement, however, are not critical to the present invention.

System 800 includes a number of components, such as a central processing unit (CPU) 810, a memory 820, an input/output (I/O) device(s) 830, and a database 860 that can be implemented in various ways. For example, an integrated platform (such as a workstation, personal computer, laptop, etc.) may comprise CPU 810, memory 820 and I/O devices 830. In such a configuration, components 810, 820, and 830 may connect through a local bus interface and access to database 860 (implemented as a separate database system) may be facilitated through a direct communication link, a local area network (LAN), a wide area network (WAN) and/or other suitable connections. For another example, system 800 may be part of a larger client-server system.

CPU 810 may be one or more known processing devices, such as a microprocessor from the Pentium family manufactured by Intel™. Memory 820 may be one or more storage devices configured to store information used by CPU 810 to perform certain functions related to embodiments of the present invention, including front end client application functions and/or back end server application functions. Memory 820 may be a magnetic, semiconductor, tape, optical, or other type of storage device. In one embodiment, memory 820 includes one or more programs 825 that, when executed by CPU 810, perform various processes consistent with the present invention. For example, memory 820 may include a front end client application that interacts with a state machine back end or a back end server application that implements a state machine to control access to databases and uniformly and correctly update all related business objects when a business object changes. Memory 820 may also include other programs that perform other functions, such as a database manager program.

Methods, systems, and articles of manufacture consistent with the present invention are not limited to programs configured to perform dedicated tasks. For example, memory 820 may be configured with a program 825 that performs several functions when executed by CPU 810. For example, memory 820 may include an application program that incorporates the functions of client application and a server application. Alternatively, CPU 810 may execute one or more programs located remotely from system 800. For example, system 800 may access one or more remote programs that, when executed, perform functions related to embodiments of the present invention.

Memory 820 may be also be configured with an operating system (not shown) that performs several functions well known in the art when executed by CPU 810. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 830 may comprise one or more input/output devices that allow data to be received and/or transmitted by system 800. For example, I/O device 830 may include one or more input devices, such as a modem, network connection, keyboard, touch screen, mouse, and the like, that enable data to be input, including data from a user. Further, I/O device 830 may include one or more output devices, such as a modem, network connection, display screen, CRT monitor, LCD monitor, plasma display, printer, speaker devices, and the like, that enable data to be output or presented, including presentation to a user. The configuration and number of input and/or output devices incorporated in I/O device 830 are not critical to the invention.

Database 860 may comprise one or more databases that store information and are accessed and/or managed through system 800. By way of example, database 860 may be an Oracle™ database, a Sybase™ database, or other relational database, or database 860 may be part of a central product validation system. Systems and methods of the present invention, however, are not limited to separate databases or even to the use of a database, and can include systems that use data from practically any source, such as the internet and other organized collections of data, or memory systems.

One of ordinary skill in the art will recognize that the embodiments described and suggested above can be implemented using conventional equipment and programming techniques.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, performed by a processor, for saving business objects comprising:
  receiving a modified business object, wherein the business object comprises a purchase order business object or an invoice business object;
  determining a set of related business objects traceable from the modified business object, wherein the related business objects are traceable from the modified business object based on a parent-child association, an association between datasets of the same type, and an association to other business objects;
  creating a transactional buffer to temporarily store local copies of the modified business object and the set of related business objects;
  modifying the local copies of the set of related business objects based on a modification of the modified business object each time the modified business object is received;
  determining whether both the modified business object and the modified set of related business objects can be saved, wherein determining whether both can be saved comprises:
    sending a pre-commit command to at least one database manager;
    receiving a response from the at least one database manager; and
    analyzing the response;
  saving both the modified business object and the modified set of related business objects upon a determination that both can be saved;
  triggering a failure processing routine upon a determination that both the modified business object and the modified set of related business objects cannot be saved;
  determining whether the modifications to the modified business object require a new business object to be created; and
  creating a new business object based on the determination of whether the modifications to the modified business object require a new business object to be created.

2. The method of claim 1, wherein saving comprises:
  committing data corresponding to the modified business object and the modified set of related business objects to at least one database.

3. The method of claim 1, wherein determining a set of related business objects comprises:
  analyzing a set of method calls from the modified business object to identify a set of called business objects.

4. The method of claim 1, wherein modifying the set of related business objects comprises:
  changing data in at least one business object from the set of related business objects such that the changed data is consistent with the modification of the modified business object.

5. The method of claim 1, wherein determining whether both the modified business object and the modified set of related business objects can be saved includes determining whether the modified set of related business objects is in the process of being modified.

6. The method of claim 1, further comprising:
  confirming that the saving of both the modified business object and the modified set of related business objects is successful,
  wherein if the saving is not successful, failure processing is completed.

7. The method of claim 1, further comprising:
  identifying a database associated with the set of related business objects;
  determining whether the modified business object affects the data in the database;
  determining, if the modified business object affects the data in the database, whether the data in the database is being modified by a user;
  modifying the set of related business objects and the data in the database to be consistent with the modified business object if the data in the database is not being modified; and
  preventing modification to the data in the database if the data in the database is being modified by the user.

8. The method of claim 1, wherein:
  the modified business object includes modified data;
  the modifying the set of related business objects comprises:
    retrieving a local copy of the set of related business objects; and
    changing data in the set of related business objects to be consistent with the modified data; and
  the saving both the modified business object and the modified set of related business objects comprises storing the local copy in a database.

9. A system including a processor and a memory for saving business objects comprising:
  means for receiving a modified business object, wherein the business object comprises a purchase order business object or an invoice business object;

means for retrieving a local copy of the modified business object to temporarily store modified data;

means for determining a set of related business objects traceable from the modified business object, wherein the related business objects are traceable from the modified business object based on a parent-child association, an association between datasets of the same type, and an association to other business objects;

means for retrieving local copies of the set of related business objects to temporarily store modified data;

means for modifying the local copies of the set of related business objects based on a modification of the modified business object each time the modified business object is received;

means for determining whether both the modified business object and the modified set of related business objects can be saved, wherein the means for determining whether both can be saved comprises:
  means for sending a pre-commit command to at least one database manager;
  means for receiving a response from the at least one database manager; and
  means for analyzing the response;

means for saving both the modified business object and the modified set of related business objects upon a determination that both can be saved;

means for triggering a failure processing routine upon a determination that both the modified business object and the modified set of related business objects cannot be saved;

means for determining whether the modifications to the modified business object require a new business object to be created; and means for creating a new business object based on the determination of whether the modifications to the modified business object require a new business object to be created.

10. The system of claim 9, wherein the means for saving comprises:
  means for committing data corresponding to the modified business object and the modified set of related business objects to at least one database.

11. The system of claim 9, wherein the means for determining a set of related business objects comprises:
  means for analyzing a set of method calls from the modified business object to identify a set of called business objects.

12. The system of claim 9, wherein the means for modifying the set of related business objects comprises:
  means for changing data in at least one business object from the set of related business objects such that the changed data is consistent with the modification of the modified business object.

13. A non-transitory computer-readable storage medium encoded with a computer program including instructions for performing a method for saving business objects, the method comprising:
  receiving a modified business object, wherein the business object comprises a purchase order business object or an invoice business object;
  retrieving a local copy of the modified business object to temporarily store modified data;
  determining a set of related business objects traceable from the modified business object, wherein the related business objects are traceable from the modified business object based on a parent-child association, an association between datasets of the same type, and an association to other business objects;
  retrieving local copies of the set of related business objects to temporarily store modified data;
  modifying the local copies of the set of related business objects based on a modification of the modified business object each time the modified business object is received;
  determining whether both the modified business object and the modified set of related business objects can be saved, wherein determining whether both can be saved comprises:
    sending a pre-commit command to at least one database manager;
    receiving a response from the at least one database manager; and
    analyzing the response;
  saving both the modified business object and the modified set of related business objects upon a determination that both can be saved;
  triggering a failure processing routine upon a determination that both the modified business object and the modified set of related business objects cannot be saved;
  determining whether the modifications to the modified business object require a new business object to be created; and
  creating a new business object based on the determination of whether the modifications to the modified business object require a new business object to be created.

14. The non-transitory computer-readable storage medium of claim 13, wherein saving comprises:
  committing data corresponding to the modified business object and the modified set of related business objects to at least one database.

15. The non-transitory computer-readable storage medium of claim 13, wherein determining a set of related business objects comprises:
  analyzing a set of method calls from the modified business object to identify a set of called business objects.

16. The non-transitory computer-readable storage medium of claim 13, wherein modifying the set of related business objects comprises:
  changing data in at least one business object from the set of related business objects such that the changed data is consistent with the modification of the modified business object.

17. A server for saving business objects comprising:
  a receiver that receives a save request specifying a business object to be saved, wherein the business object comprises a purchase order business object or an invoice business object;
  a processor, communicatively connected to the receiver, adapted for:
    entering a software-controlled state in which receiving a service request will trigger a failure processing routine;
    identifying a set of related business objects affected by data in the business object to be saved, wherein the related business objects are affected by data in the business object to be saved based on a parent-child association, an association between datasets of the same type, and an association to other business objects;
  each time the business object to be saved is received, modifying data in the set of related business objects to be consistent with the data in the business object to be saved;

determining whether the data in the business object to be saved requires a new business object to be created; and creating a new business object based on the determination of whether the data in the business object to be saved requires a new business object to be created;

a transmitter, communicatively connected to the processor, that:

sends a plurality of pre-save checks to at least one database manager for the data in the business object to be saved and the data in the set of related business objects;

sends a command to commit the data in the business object to be saved and a command to commit the data in the set of related business objects to at least one database controlled by the at least one database manager; and transmits a completion notification to an entity that sent the save request specifying the business object to be saved;

wherein the processor is further adapted to exit the state in which receiving a service request will trigger a failure processing routine after the commands to commit are sent.

18. A system including a processor and a memory for saving business objects comprising:

means for receiving a save request specifying a business object to be saved, wherein the business object comprises a purchase order business object or an invoice business object;

means for entering a software-controlled state in which receiving a service request will trigger a failure processing routine;

means for identifying a set of related business objects affected by data in the business object to be saved, wherein the related business objects are affected by data in the business object to be saved based on a parent-child association, an association between datasets of the same type, and an association to other business objects;

means for modifying data in the set of related business objects to be consistent with the data in the business object to be saved each time the save request is received;

means for determining whether the data in the business object to be saved requires a new business object to be created;

means for creating a new business object based on the determination of whether the data in the business object to be saved requires a new business object to be created;

means for sending a plurality of pre-save checks to at least one database manager for the data in the business object to be saved and the data in the set of related business objects;

means for committing the data in the business object to be saved and the data in the set of related business objects to at least one database controlled by the at least one database manager;

means for transmitting a completion notification to an entity that sent the save request specifying the business object to be saved; and means for exiting the software-controlled state in which receiving a service request will trigger a failure processing routine.

19. A non-transitory computer-readable storage medium encoded with a computer program including instructions for performing a method for saving business objects, the method comprising:

receiving a save request specifying a business object to be saved, wherein the business object comprises a purchase order business object or an invoice business object;

entering a software-controlled state in which receiving a service request will trigger a failure processing routine;

identifying a set of related business objects affected by data in the business object to be saved, wherein the related business objects are affected by data in the business object to be saved based on a parent-child association, an association between datasets of the same type, and an association to other business objects;

modifying data in the set of related business objects to be consistent with the data in the business object to be saved each time the modified business object is received;

determining whether the data in the business object to be saved requires a new business object to be created;

creating a new business object based on the determination of whether the data in the business object to be saved requires a new business object to be created;

sending a plurality of pre-save checks to at least one database manager for the data in the business object to be saved and the data in the set of related business objects;

committing the data in the business object to be saved and the data in the set of related business objects to at least one database controlled by the at least one database manager;

transmitting a completion notification to an entity that sent the save request specifying the business object to be saved; and exiting the software-controlled state in which receiving a service request will trigger a failure processing routine.

* * * * *